(12) United States Patent
Korman

(10) Patent No.: US 7,697,806 B2
(45) Date of Patent: Apr. 13, 2010

(54) FIBER OPTIC CABLE WITH DETECTABLE FERROMAGNETIC COMPONENTS

(75) Inventor: John J Korman, Stony Brook, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 11/797,761

(22) Filed: May 7, 2007

(65) Prior Publication Data

US 2008/0279512 A1 Nov. 13, 2008

(51) Int. Cl.
*G02B 6/44* (2006.01)
(52) U.S. Cl. ..................... 385/100; 385/101
(58) Field of Classification Search ............. 385/100, 385/101, 105
See application file for complete search history.

(56) References Cited

U.S. PATENT DOCUMENTS

| | | | | |
|---|---|---|---|---|
| 3,701,131 A * | 10/1972 | Brauser et al. | ............... | 365/122 |
| 4,083,484 A * | 4/1978 | Polizzano et al. | ........... | 228/130 |
| 4,418,984 A * | 12/1983 | Wysocki et al. | ............. | 385/127 |
| 4,458,105 A * | 7/1984 | Roenisch et al. | ........ | 174/106 D |
| 5,142,105 A * | 8/1992 | Kihlken et al. | ............... | 174/112 |
| 5,812,711 A * | 9/1998 | Glass et al. | .................... | 385/37 |
| 6,243,519 B1 * | 6/2001 | Ishikawa et al. | ............ | 385/111 |
| 6,466,719 B2 * | 10/2002 | Stottlemyer et al. | ......... | 385/104 |
| 6,485,191 B1 * | 11/2002 | Sato | ............................. | 385/73 |
| 6,795,627 B1 * | 9/2004 | Deutsch | ...................... | 385/123 |
| 2002/0085819 A1 * | 7/2002 | Stottlemyer et al. | ......... | 385/104 |
| 2004/0163809 A1 * | 8/2004 | Mayeu et al. | ............ | 166/255.1 |
| 2005/0135759 A1 * | 6/2005 | Wang et al. | .................. | 385/123 |
| 2007/0108201 A1 * | 5/2007 | Vinegar et al. | .............. | 219/770 |
| 2007/0144754 A1 * | 6/2007 | Donazzi et al. | ............... | 174/34 |

* cited by examiner

*Primary Examiner*—Ellen Kim

(57) ABSTRACT

A fiber optic cable with detectable ferromagnetic components may include a plurality of detectable ferromagnetic components distributed longitudinally along the cable and insulated from each other. The fiber optic cable may contain the typical layers of fiber core, cladding, coating, strengthening fibers, and cable jacket. Each of the detectable ferromagnetic components may be a ferromagnetic metal strip forming a band around the cable. The metal bands may be distributed at different locations of the cable. Other ferromagnetic materials than metal may be used, as long as they are detectable by a metal detector. The detectable ferromagnetic components may form patterns that may be identified by the metal detector.

19 Claims, 8 Drawing Sheets

200

500

FIBER OPTIC CABLE WITH DETECTABLE FERROMAGNETIC COMPONENTS

BACKGROUND INFORMATION

Telecommunication providers (TELCOs) have made significant investments in fiber infrastructure in order to deliver fiber-based services to their customers. In the deployment of a fiber optical network, fiber optic cables may need to be buried near or on subscribers' premises. The distance between the top of the cable and the surface under which it is installed (depth of burial) shall be sufficient to protect the cable from damage imposed by expected surface usage. When the cable needs to be accessed or when someone needs to dig near the cables, the location of the cables needs to be determined. This may result in a call to the TELCO who sends a worker to mark the location of the buried cable. Typically, the location of the cable is marked through the use of continuous metallic tracing wires so that that a metal detector may be used to locate a buried fiber optic cable. These continuous tracing wires may be embedded in the fiber optic cable or may be separate entities placed along side the buried fiber optic cable. Continuous metallic wires need to be carefully grounded to safeguard personnel and the communication network against stray voltage and electrical faults. Therefore, workers need to be trained in the grounding of the cables and need to properly ground the cables.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION

The following description is intended to convey a thorough understanding of the embodiments described by providing a number of specific embodiments and details involving systems and methods for implementing a fiber optic cable having detectable ferromagnetic components. It should be appreciated, however, that the present disclosure is not limited to these specific embodiments and details, which are exemplary only. For example, the systems and methods may also be used with other non-conductive, dielectric pipes, e.g., Polyvinyl chloride (PVC) conduit or cables that may be buried underground or hidden (e.g., behind walls). It is further understood that one possessing ordinary skill in the art, in light of known systems and methods, would appreciate the use of the disclosures for its intended purposes and benefits in any number of alternative embodiments, depending upon specific design and other needs.

According to exemplary embodiments of the present application, a fiber optic cable with detectable ferromagnetic components may include a plurality of detectable ferromagnetic components distributed longitudinally along the cable and insulated from each other. The fiber optic cable may contain the typical layers of fiber core, cladding, coating, strengthening fibers, and cable jacket. Each of the detectable ferromagnetic components may be a ferromagnetic metal strip forming a band around the cable. The metal bands may be distributed at different locations of the cable. Other ferromagnetic materials than metal may be used, as long as they are detectable by a metal detector. The detectable ferromagnetic components may form patterns that may be identified by the metal detector.

Figure 1:
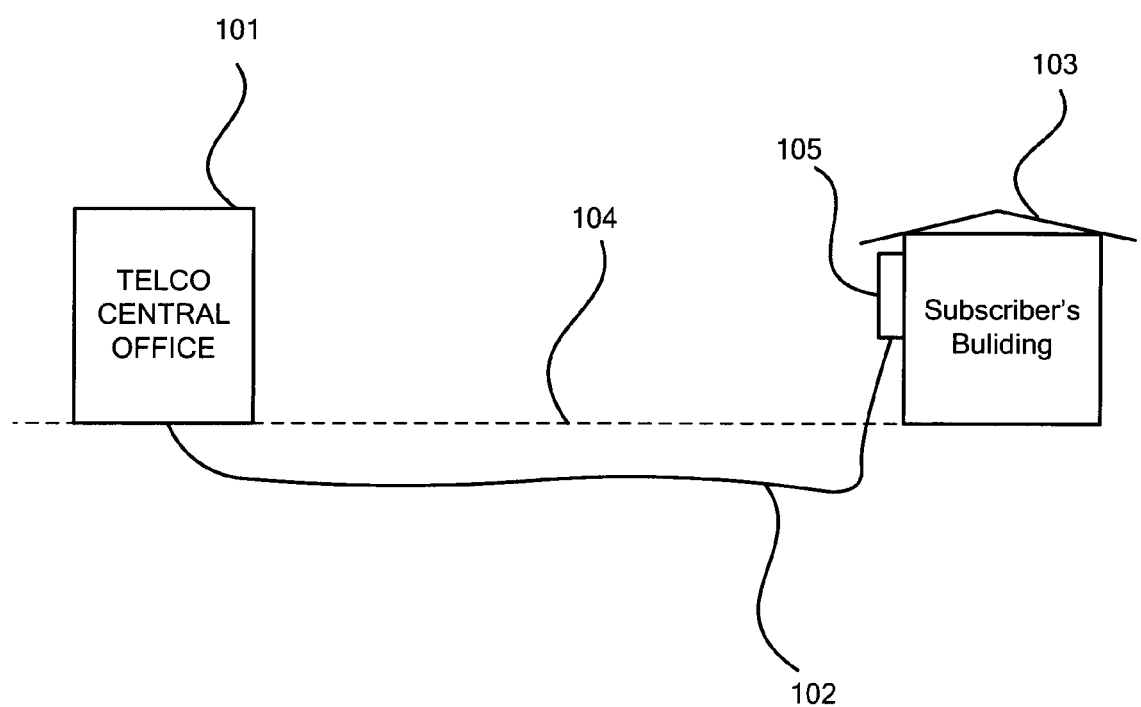
FIG. 1 illustrates a network architecture of an optical fiber network in accordance with an exemplary embodiment of the present disclosure.

Referring to FIG. 1, a network architecture of an optical fiber network 100 in accordance with an exemplary embodiment of the present disclosure is illustrated. At a high level, at one end of the network 100 may be a fiber services end provider, a TELCO central office 101, and a fiber services subscriber or subscriber's building 103. Typically, more than one fiber service subscribers may be connected to TELCO central office 101. In this example, only one subscriber 103 is shown for simplicity. The subscriber 103 may be one or a plurality of business or individual consumers. Though not shown in FIG. 1, there may exists a plurality of optical devices, such as multiplexers, repeaters, splitters, switches, etc., along the cable 102 between the subscriber's building 103 and the Telco central office 101. Physical structures such as poles, buildings holding the optical devices are also omitted.

As it is common in deployment of any cable network, the fiber optic cable 102 may be buried beneath the ground 104 before reaching an Optical Network Terminal device (ONT) 104 outside the subscriber's building 103. The buried cable 102 may be a concern for any work that involves breaking ground around the subscriber's building 103 and/or needs access to the buried cable 102. As a result, the Telco may be requested to mark the location of the cable 102. In the exemplary embodiments of the present disclosure, the cable 102 may include insulated detectable ferromagnetic components so that someone may detect the ferromagnetic components using a metal detector and may mark the location of the cable 102.

Figure 2:
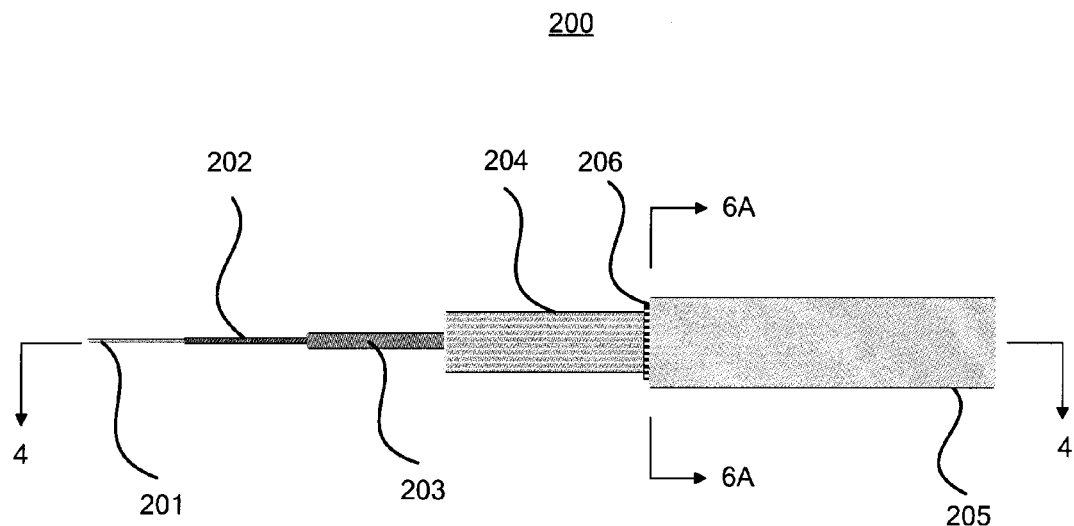
FIG. 2 illustrates a schematic diagram of a fiber optic cable in accordance with an exemplary embodiment of the present disclosure.

FIG. 2 illustrates a schematic diagram of a fiber optic cable in accordance with an exemplary embodiment of the present disclosure. As shown, a fiber 201 may be at the center of a fiber optic cable 200. A cladding layer 202 may cover the fiber 201. A coating layer 203 may cover the cladding layer 202. One or more layers of strengthening fibers 204 may cover the coating layer 203. A cable jacket 205 may cover the strengthening fibers 204. A plurality of detectable ferromagnetic components 206 (only one shown) may be placed longitudinally along the fiber optic cable 200. As shown in FIG. 2, the detectable ferromagnetic components 206 are placed between the strengthening fibers 204 and the cable jacket 205. In other embodiments, the ferromagnetic components may be placed in various locations and/or patterns within the layers of the cable and/or on top of the cable.

The material between the detectable ferromagnetic components 206 provides insulation. In this embodiment, the strengthening fibers 204 and the cable jacket 205 are made of non-conductive materials, and insulate the detectable ferromagnetic components 206 from each other. Since the ferromagnetic components 206 are spaced apart and are insulated, the fiber optic cable 200 does not need to be grounded to protect against stray voltages or electric faults that are concerns with the continuous metallic tracing wires. In addition, a worker does not need additional training for grounding the fiber optic cable 200. Material costs and engineering requirements for creating grounding facilities for tracing wires are eliminated as well.

Referring back to FIG. 2, the ferromagnetic components 206 may be metal strips that form bands encircling the radial center of the fiber optic cable 200. But other embodiments of detectable ferromagnetic components are contemplated by this disclosure. In various embodiments, the ferromagnetic components 206 may be any shape and/or format, as long as the ferromagnetic components 206 and/or a group of the ferromagnetic components 206 may be detected, or are capable of being detected, by a metal detector.

Figure 3A:
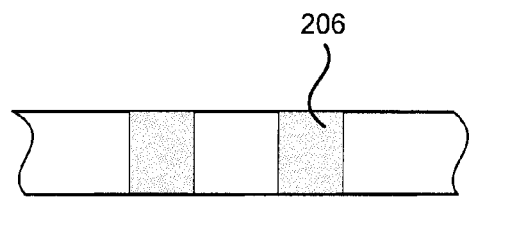
FIGS. 3A, 3B and 3C illustrate various detectable ferromagnetic components in accordance with exemplary embodiments of the present disclosure
Figure 3B:
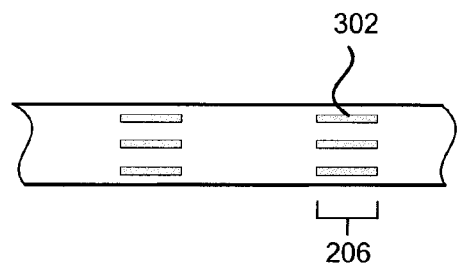
Figure 3C:
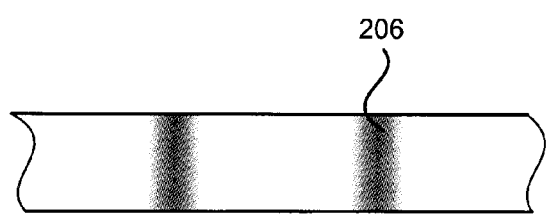

FIGS. 3A, 3B and 3C illustrate various detectable ferromagnetic components in accordance with exemplary embodiments of the present disclosure. In FIG. 3A, the detectable ferromagnetic component 206 comprises metal pieces dispersed in a carrier, such as plastic or ceramic, and the carrier may be molded into a strip or band. In FIG. 3B, the detectable ferromagnetic component 206 comprises a plurality of ferromagnetic material strips 302 which are vertically spaced apart from each other and form a band encircling the radial center of the fiber optic cable 200. In FIG. 3C, ferromagnetic material may be unevenly dispersed within the cable jacket 205 with sections having varying concentrations of the ferromagnetic material such that one section 206 is detectable by a metal detector and another section is not detectable by a metal detector. In such an embodiment, the detectable sections are sufficiently insulated to prevent stray voltages. It is noted that in any of above described embodiments, the plurality of detectable ferromagnetic components 206 may be placed in other locations of a cable 200, such as in or around the cladding layer 202, or, in or around the coating layer 203. The various layers of cable 200 may be a non-conductive material that may insulate the detectable ferromagnetic components 206. Furthermore, the detectable ferromagnetic components 206 may be made of any metal such as, but not limited to, iron or stainless steel. But other ferromagnetic materials may also be used, such as, but not limited to, ferromagnetic porcelain, ferromagnetic ceramic, and ferromagnetic plastic.

Figure 4:
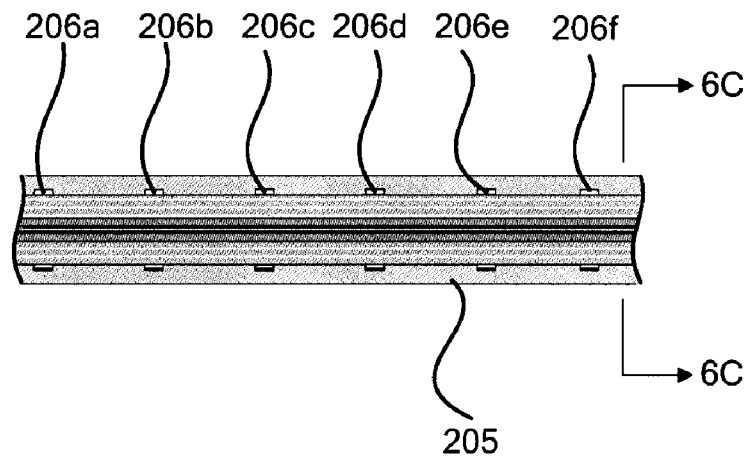
FIG. 4 illustrates a cross-sectional view of the fiber optic cable of FIG. 2 along line 4-4 in accordance with an exemplary embodiment of the present disclosure.

FIG. 4 illustrates a cross-sectional view of the fiber optic cable of FIG. 2 along line 4-4 in accordance with an exemplary embodiment of the present disclosure. As shown, a plurality of detectable ferromagnetic components 206a, 206b, 206c, 206d, 206e, 206f are of similar shape and are distributed along the fiber optic cable 200. Moreover, the longitudinal distance between the detectable ferromagnetic components 206 are approximately equal. For example, the distance between 206a and 206b is approximately the same as the distance between 206e and 206f. By placing the ferromagnetic components 206 approximately equal distance from each other, the fiber optic cable 200 may have a detectable or identifiable pattern that may be detected by a metal detector. By varying the location of the ferromagnetic components 206, cables 200 may have different detectable or identifiable patterns.

Figure 5:
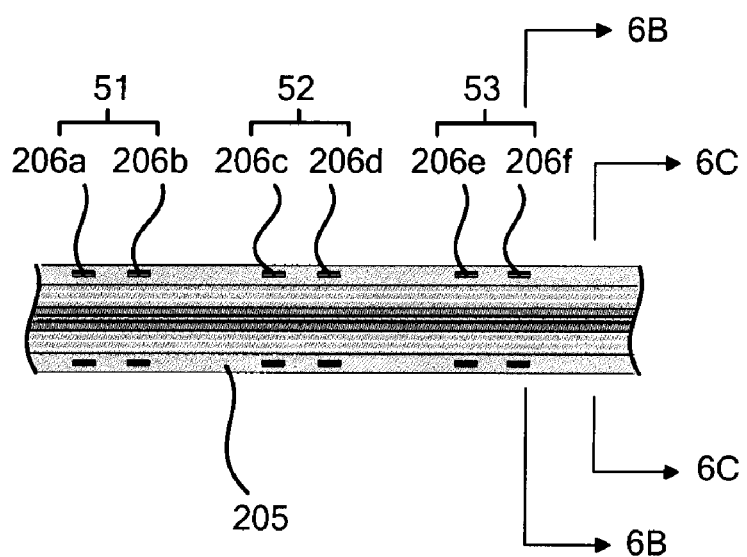
FIG. 5 illustrates a cross-sectional view of the fiber optic cable of FIG. 2 along line 4-4 in accordance with an exemplary embodiment of the present disclosure.

Referring to FIG. 5, a cable having a distribution pattern of the ferromagnetic components 206 in accordance with an exemplary embodiment of the present disclosure. As shown, the plurality of the ferromagnetic components 206 may form an identifiable pattern by placing two of the plurality of the ferromagnetic components 206 closer longitudinally as a group, such as group 51, 52 and 53. Each group of the ferromagnetic components 206 may be placed with approximately equal distance to the two closest adjacent groups. In addition, the distance between the two ferromagnetic components 206 forming a group may be fixed and approximately equal for all groups.

FIG. 4 and FIG. 5 illustrate two identifiable patterns of the distribution of the ferromagnetic components 206, other identifiable patterns are contemplated by this disclosure. Therefore, a metal detector may be used to not only detect the location of a cable 200, but may also be used to differentiate between two or more buried cables. In addition, the different patterns of the detectable ferromagnetic components 206 may be used to differentiate between types of cables 200. For example, the pattern illustrated in FIG. 4 may be used for fiber optic cables providing packet switched services and the pattern illustrated in FIG. 5 may be used for fiber optic cables providing time division multiplexing services.

FIG. 4 and FIG. 5 illustrate the ferromagnetic components 206 being located in different locations relative to the radial center of the cable. As shown in FIG. 4, the ferromagnetic components 206 are embedded inside the cable jacket 205. In contrast, FIG. 5 depicts that the ferromagnetic components 206 are placed between the strengthening fibers 204 and the cable jacket 205. In other embodiments, the ferromagnetic components may be placed in various locations within the layers of the cable and/or on top of the cable. In the embodiments that the ferromagnetic components may be placed on top of the cable, the ferromagnetic components may need to be coated to be insulated from surrounding potential conductive medium.

Figure 6A:
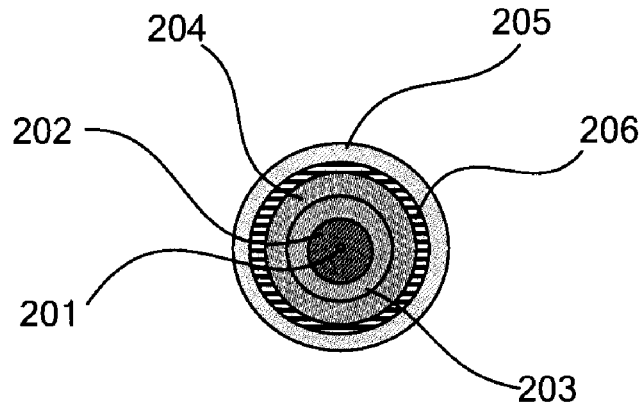
FIG. 6A illustrates a cross-sectional view of the fiber optic cable of FIG. 2 along line 6A-6A in accordance with an exemplary embodiment of the present disclosure.

FIG. 6A a illustrates a cross-sectional view of the fiber optic cable of FIG. 2 along line 6A-6A in accordance with an exemplary embodiment of the present disclosure. As shown in FIG. 6A, the ferromagnetic components 206 form closed bands around the inner components of the fiber optic cable 200: the fiber 201, the cladding layer 202, the coating 203, the strengthening layer 204. As shown, the ferromagnetic components 206 may be positioned between the strengthening fibers 204 and cable jacket 205. The strengthening fibers 204 and cable jacket 205 may be made of non-conductive materials to insulate the ferromagnetic components 206 from each other.

Figure 6B:
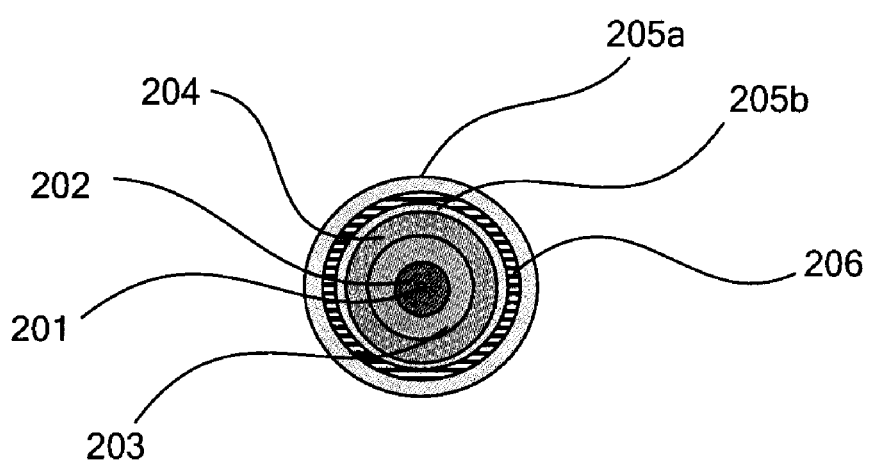
FIG. 6B illustrates a cross-sectional view of the fiber optic cable of FIG. 2 along line 6B-6B in accordance with an exemplary embodiment of the present disclosure.

FIG. 6B illustrate a cross-sectional view of the fiber optic cable of FIG. 4 along line 6B-6B in accordance with an exemplary embodiment of the present disclosure. As shown in FIG. 6B, the ferromagnetic component 206 forms closed bands around the inner components of the fiber optic cable 200: the fiber 201, the cladding layer 202, the coating 203, the strengthening layer 204. As shown, the ferromagnetic component 206 is embedded within in the cable jacket 205, e.g., between a first layer 205a and a second layer 205b.

Figure 6C:
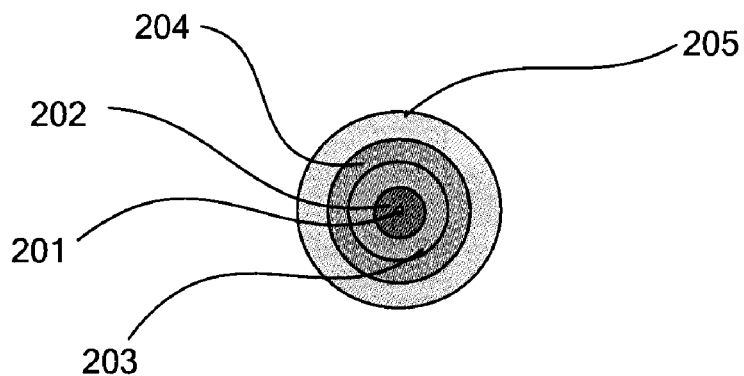
FIG. 6C illustrates a cross-sectional view of the fiber optic cable of FIG. 4 and/or FIG. 5 along line 6C-6C in accordance with an exemplary embodiment of the present disclosure.

FIG. 6C illustrates a cross-sectional view of the fiber optic cable of FIG. 4 and/or FIG. 5 along line 6C-6C in accordance with an exemplary embodiment of the present disclosure. In contrast to FIG. 6A and 6B, FIG. 6C depicts the cross-section of the fiber optic cable 200 at locations that do not include a ferromagnetic component 206.

Figure 7:
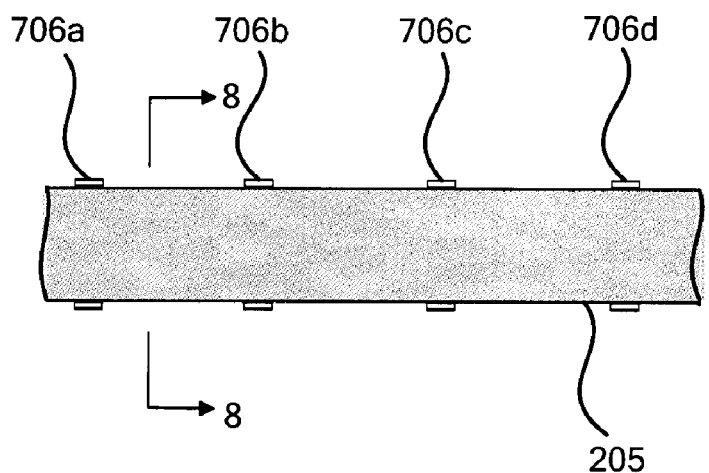
FIG. 7 illustrates a schematic diagram of a fiber optic cable in accordance with an exemplary embodiment of the present disclosure.

FIG. 7 illustrates a schematic diagram of another fiber optic cable in accordance with an exemplary embodiment of the present disclosure. As shown in FIG. 7, in this embodiment, a fiber optic cable 700 comprises a plurality of detectable ferromagnetic components 706a, 706b, 706c, 706d located outside the cable jacket 205. The cable jacket 205 may be made of a non-conductive material. The plurality of detectable ferromagnetic components 706a, 706b, 706c, 706d may be insulated from each other by the medium surrounding them, and the cable jacket 205. When the fiber optic cable 700 may be above ground, the medium surrounding the plurality of detectable ferromagnetic components 706a, 706b, 706c, 706d may be air. This exemplary embodiment may be used in the building where the fiber optic cable or a PVC pipe may be hidden behind walls but not exposed to conductive medium. Because the plurality of detectable ferromagnetic components 706a, 706b, 706c, 706d may be exposed to air, a stainless ferromagnetic material, such as, but not limited to, stainless steel, ferromagnetic porcelain, or any other ferromagnetic material that does not substantially degrade in air is contemplated by this disclosure.

Figure 8:
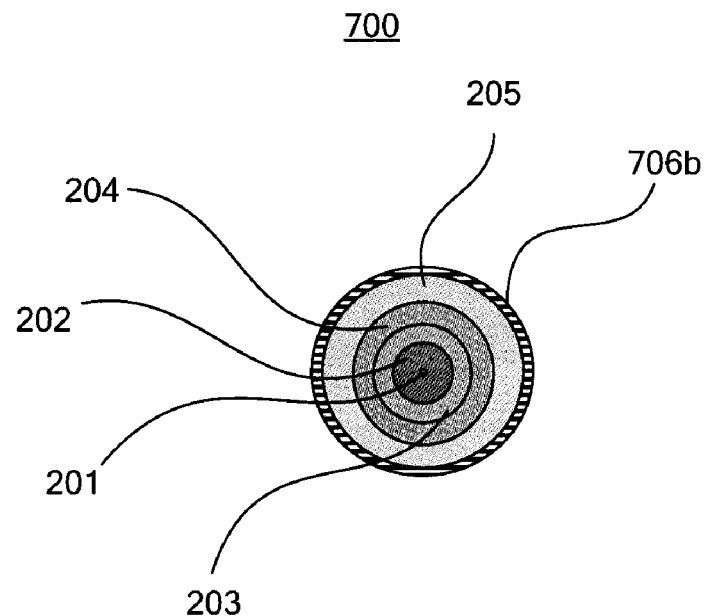
FIG. 8 illustrates a cross-sectional view of the fiber optic cable of FIG. 7 along line 8-8 in accordance with an exemplary embodiment of the present disclosure.

In another embodiment according to FIG. 7, The plurality of detectable ferromagnetic components 706 may be covered by a protective non-conductive jacket (not shown). The extra layer of jacket may protect against the moisture in the ground, which may provide a path between the isolated ferromagnetic components by passing current FIG. 8 illustrates a cross-sectional view of the fiber optic cable of FIG. 7 along line 8-8 in accordance with an exemplary embodiment of the present disclosure. As shown in FIG. 8, the plurality of detectable ferromagnetic components 706 located outside the cable jacket 205.

Figure 9:
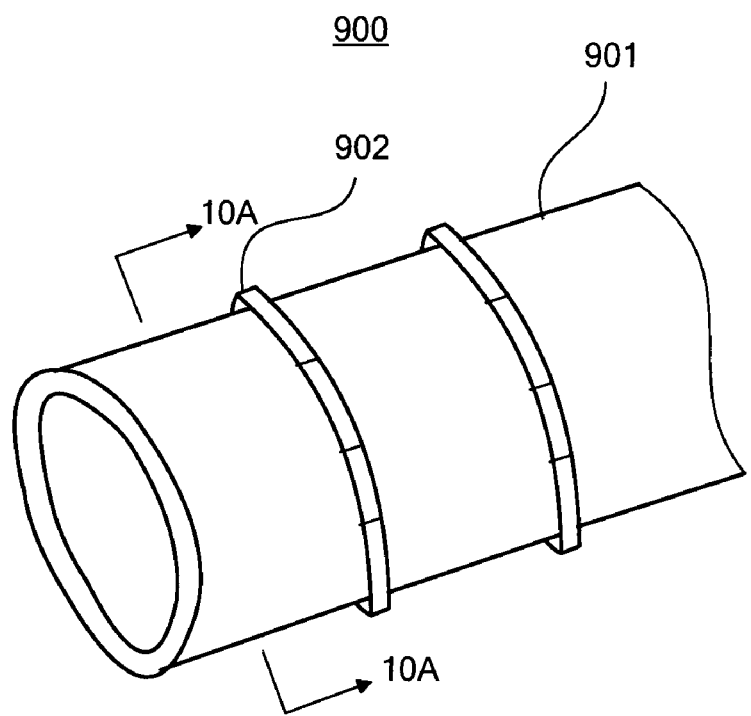
FIG. 9 illustrates a schematic diagram of a cable jacket in accordance with an exemplary embodiment of the present disclosure.

FIG. 9 illustrates a schematic diagram of a cable jacket in accordance with an exemplary embodiment of the present disclosure. According to FIG. 9, a cable jacket 900 may be manufactured to carry a plurality of insulated detectable ferromagnetic components 902. In this exemplary embodiment, the cable jacket carries the plurality of insulated ferromagnetic components 902 on its outer surface. In other embodiments, the cable jacket 900 may be covered with another shield or coating.

Figures 10A, 10B, 10C:
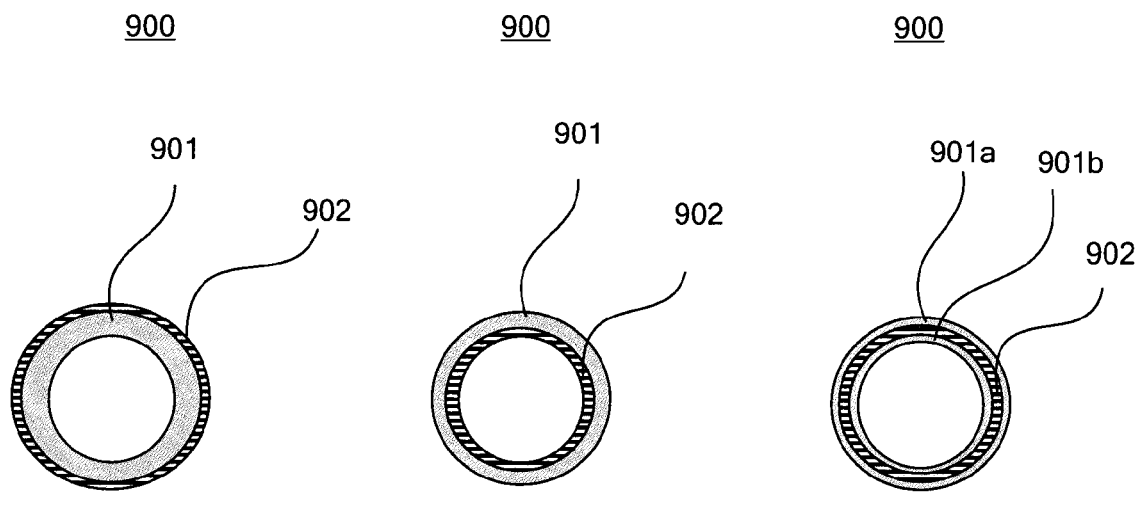
FIG. 10A illustrates a cross-sectional view of the cable jacket of FIG. 9 along line 10A-10A in accordance with an exemplary embodiment of the present disclosure.
FIG. 10B illustrates a cross-sectional view of a cable jacket in accordance with an exemplary embodiment of the present disclosure.
FIG. 10C illustrates a cross-sectional view of a cable jacket in accordance with an exemplary embodiment of the present disclosure.

FIG. 10A illustrates a cross-sectional view of the cable jacket of FIG. 9 along line 10A-10A in accordance with an exemplary embodiment of the present disclosure. FIG. 10B and 10C illustrate cross-sectional views of a cable jacket in accordance with other exemplary embodiments of the present disclosure. In the example of a cable jacket of FIG. 10B, the detectable ferromagnetic component 902 is located at the inner surface of a cable jacket 901. In the example of a cable jacket of FIG. 10C, the detectable ferromagnetic component 902 is embedded between the cable jacket 901a and 901b.

Figure 11:
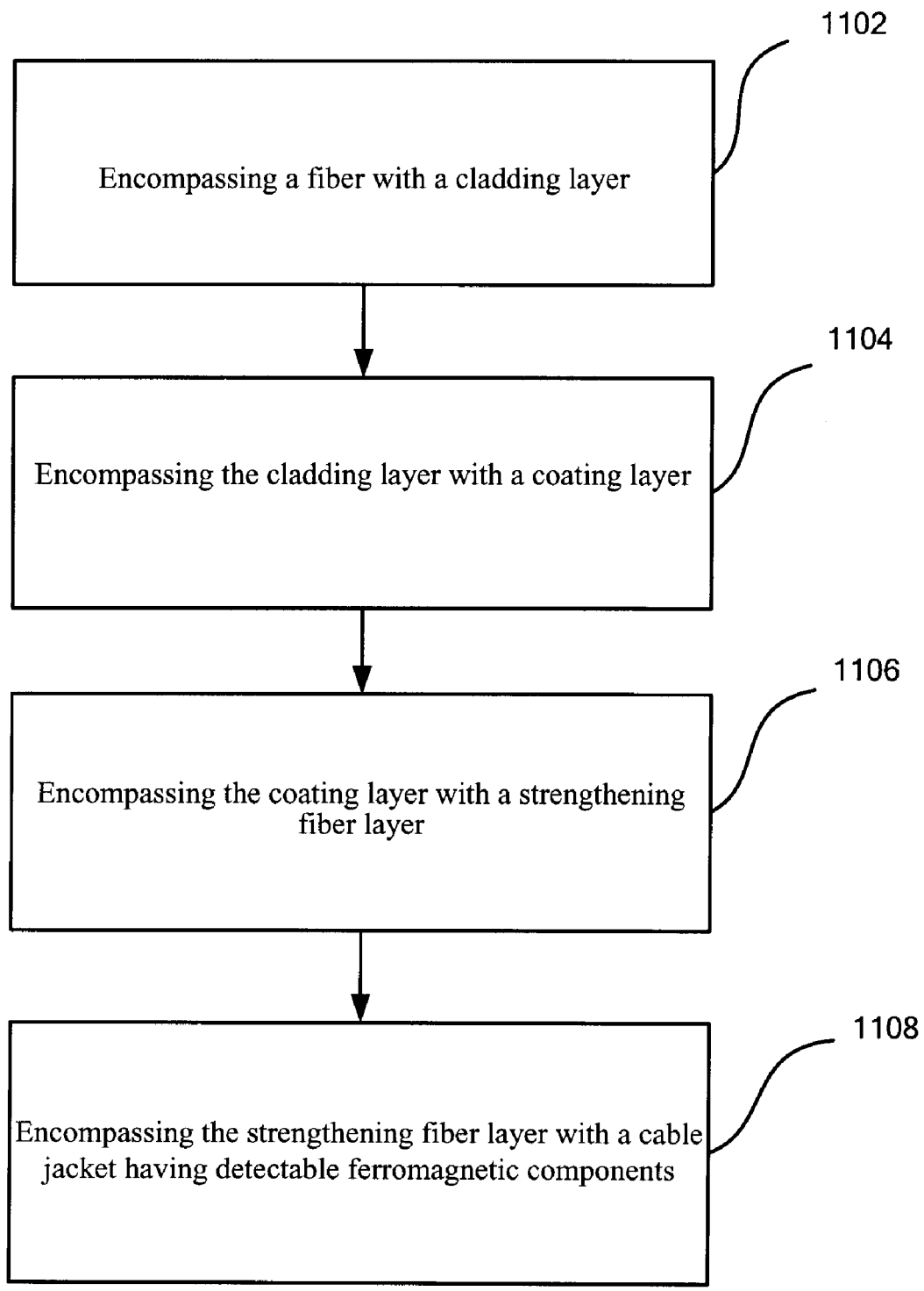
FIG. 11 illustrates a flow diagram for making a fiber optic cable with isolated detectable ferromagnetic components in accordance with an exemplary embodiment of the present disclosure.

FIG. 11 illustrates a flow diagram for making a fiber optic cable with isolated detectable ferromagnetic components in accordance with an exemplary embodiment of the present disclosure. This exemplary method is provided by way of example, as there are a variety of ways to carry out methods. The flow diagram 1100 may begin at block 1102. In block 1102, a fiber is encompassed by a cladding layer. For example, one or more fibers may each be substantially encompassed with a cladding layer. The fiber and cladding layer may be made of, but not limited to, glass and glass, glass and plastic, and plastic and plastic, respectively. The fiber and cladding may be manufactured together as a single solid component. The fiber and cladding layer may form the optical section of the fiber optic cable.

In block 1104, the cladding layer may be encompassed by a coating layer. For example, one or more coating layers may be applied to substantially encompass the cladding layer. The coating layer can be made of, but not limited to, ultraviolet (UV) light-cured acrylate, polymer, nonporous hard elastomers or high-performance PVC. The coating layer may provide protection to the optical section.

In block 1106, the coating layer may be encompassed by a strengthening fiber layer. For example, one or more strengthening layers may be applied to substantially encompass the coating layer. The strengthening layer can be made of, but not limited to, Aramid yarn. The strengthening fiber layer may reinforce the coating layer for support, protection and also provide tensile strength.

In block 1108, the strengthening fiber layer may be encompassed by a cable jacket having embedded detectable ferromagnetic components. For example, a plurality of detectable ferromagnetic components may be distributed in the material for the cable jacket and then applied over the strengthening fiber layer. Thus, when the cable jacket material forms the cable jacket, the detectable ferromagnetic components are isolated and embedded within the cable jacket. In other embodiments according to the present disclosure, the isolated detectable ferromagnetic components may be deployed separately from sheathing of the cable jacket. In one embodiment, the isolated ferromagnetic components may be applied before the sheath creation process to form the cable jacket, thus distributing them between the strengthening layer and the cable jacket. In another embodiment, the isolated ferromagnetic components may be applied after the sheathing of the cable jacket, thus distributing them outside the cable jacket. In this embodiment, the isolated ferromagnetic components may be coated to prevent moisture in the ground from building a path to pass current between the ferromagnetic components.

Various embodiments of the present disclosure replace the continuous metallic tracing wire by the insulated ferromagnetic bands for a cable. The extra grounding requirement associated with the continuous metallic tracing wire is eliminated from the task of burying the cable. The present disclosure may improve fiber optic deployment efficiency and cut cost to TELCOs and any competitive local exchange carriers (CLECs) or Cable TV companies using fiber as a medium of transmission.

In the preceding specification, various preferred embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

The invention claimed is:

1. A cable, comprising:
   a core section comprising:
      at least one fiber;
      a cladding layer substantially encompassing the at least one fiber;
      a coating layer substantially encompassing the cladding layer; and
      a layer of strengthening fibers substantially encompassing the coating layer;
   a cable jacket; and
   a plurality of detectable ferromagnetic components distributed longitudinally along the cable and insulated from each other wherein each of the plurality of detectable ferromagnetic components comprise a ferromagnetic metal strip forming a band around the core section.

2. The cable according to claim 1, wherein the plurality of detectable ferromagnetic components are placed between the core section and the cable jacket.

3. The cable according to claim 1, wherein the plurality of detectable ferromagnetic components are embedded between an inner surface of the cable jacket and an outer surface of the cable jacket.

4. The cable according to claim 1, wherein the plurality of detectable ferromagnetic components are placed outside the cable jacket.

5. The cable according to claim 4, wherein each of the detectable ferromagnetic components is made of at least one material selected from the group consisting of stainless steel, ferromagnetic porcelain, ferromagnetic ceramic, and ferromagnetic plastic.

6. The cable according to claim 1, wherein the plurality of detectable ferromagnetic components are distributed in an identifiable pattern detectable by a metal detector.

7. The cable according to claim 1, wherein the plurality of detectable ferromagnetic components form a plurality of groups and the plurality of groups are distributed in an identifiable pattern detectable by a metal detector.

8. The cable according to claim 1, wherein each of the plurality of detectable ferromagnetic components further comprises a plurality of detectable ferromagnetic subcomponents.

9. A cable jacket, comprising a plurality of detectable ferromagnetic components distributed longitudinally along the cable jacket and insulated from each other, wherein the detectable ferromagnetic components are detectable by a metal detector, wherein each of the plurality of detectable ferromagnetic components comprise a ferromagnetic metal strip forming a band around the cable jacket.

10. The cable jacket according claim 9, wherein the plurality of detectable ferromagnetic components distributed longitudinally along the cable jacket are distributed inside of an inner surface of the cable jacket.

11. The cable jacket according claim 9, wherein the plurality of detectable ferromagnetic components distributed longitudinally along the cable jacket are embedded between an inner surface of the cable jacket and an outer surface of the cable jacket.

12. The cable jacket according claim 9, wherein the plurality of detectable ferromagnetic components distributed longitudinally along the cable jacket are distributed outside of an outer surface of the cable jacket.

13. The cable according to claim 9, wherein the plurality of detectable ferromagnetic components are distributed in an identifiable pattern detectable by a metal detector.

14. A method comprising:
   substantially encompassing at least one fiber with at least one cladding layer,
   substantially encompassing the at least one cladding layer with at least one coating layer;
   substantially encompassing the at least one coating layer with at least one strengthening fiber layer; and
   substantially encompassing the at least one strengthening fiber layer with a cable jacket having a plurality of detectable ferromagnetic components distributed longitudinally within the cable jacket, wherein each of the plurality of detectable ferromagnetic components comprise a ferromagnetic metal strip forming a band around the core section.

15. The method of claim 14, wherein the plurality of detectable ferromagnetic components are distributed within the cable jacket in an identifiable pattern detectable by a metal-detector.

16. The method of claim 14, wherein the plurality of detectable ferromagnetic components form a plurality of groups and the plurality of groups are distributed in an identifiable pattern detectable by a metal detector.

17. A method comprising:
   substantially encompassing at least one fiber with at least one cladding layer;
   substantially encompassing the at least one cladding layer with at least one coating layer;
   substantially encompassing the at least one coating layer with at least one strengthening fiber layer;
   distributing a plurality of detectable ferromagnetic components on top of the at least one layer of strengthening fiber layer; and
   substantially encompassing the at least one strengthening fiber layer and plurality of detectable ferromagnetic components with a cable jacket, wherein each of the plurality of detectable ferromagnetic components comprise a ferromagnetic metal strip forming a band around the core section.

18. The method of claim 17, wherein the plurality of detectable ferromagnetic components are distributed in an identifiable pattern detectable by a metal detector.

19. The method of claim 17, wherein the plurality of detectable ferromagnetic components form a plurality of groups and the plurality of groups are distributed in an identifiable pattern detectable by a metal detector.

* * * * *